United States Patent [19] [11] 3,999,928
Asakura et al. [45] Dec. 28, 1976

[54] APPARATUS FOR SHAPING SYNTHETIC RESIN MATERIAL

[75] Inventors: Hiroshi Asakura, Kanagawa; Keisuke Sakai, Yokohama; Hironori Mizuguchi, Kamakura, all of Japan

[73] Assignee: Toyo Kagaku Kabushiki Kaisha, Kanagawa, Japan

[22] Filed: Jan. 2, 1975

[21] Appl. No.: 537,973

[52] U.S. Cl. .............................. 425/388; 425/363; 425/143
[51] Int. Cl.² ......................................... B29C 17/00
[58] Field of Search .......... 425/143, 144, 145, 162, 425/163, 164, 165, 166, 223, 363, 224, 388; 156/462, 463; 264/40

[56] References Cited
UNITED STATES PATENTS

| 3,074,695 | 1/1963 | Hold et al. ................ 425/DIG. 235 |
| 3,709,647 | 1/1973 | Barnhart ............................ 425/224 |
| 3,763,293 | 10/1973 | Nussbaum ........................... 264/40 |
| 3,837,973 | 9/1974 | Asakura et al. ................... 156/470 |
| 3,907,486 | 8/1975 | Kennedy ............................ 425/363 |

Primary Examiner—J. Howard Flint, Jr.
Attorney, Agent, or Firm—H. Ross Workman; J. Winslow Young

[57] ABSTRACT

Apparatus for continuously shaping a heated thermoplastic synthetic resin sheet into a desired configuration followed by any desired processing, wherein the synthetic resin sheet extruded from a forming die is drawn by suction onto a shaping surface of the apparatus main body which is provided therein with a heat transfer medium accommodating chamber to constantly maintain the shaping surface of the main body at an appropriate temperature by quickly heating the shaping surface to an appropriate temperature prior to commencement of operation of the shaping apparatus, and by cooling the shaping surface to prevent the same from temperature rise due to contact with the heated synthetic resin sheet after the shaping apparatus starts operation. The apparatus is further provided with a heat transfer medium feeding means to automatically feed the heat transfer medium at a desired temperature into the heat transfer medium accommodating chamber. According to the apparatus of the present invention the heated synthetic resin sheet can be shaped into a desired configuration followed by any desired processing by maintaining the shaping surface of the main body at an appropriate temperature.

3 Claims, 5 Drawing Figures

APPARATUS FOR SHAPING SYNTHETIC RESIN MATERIAL

BACKGROUND OF THE INVENTION:

1. Field of the Invention:

This invention relates to an apparatus for shaping synthetic resin material of a type, in which a thermoplastic synthetic resin sheet is continuously shaped into a desired form, while it is being drawn by suction onto the surface of a shaping drum, and then subjected, depending on necessity, to any required processing.

2. Prior Art

An apparatus for shaping a thermoplastic synthetic resin sheet into a desired form, while it is being continuously drawn by suction onto the surface of a cylindrical shaping drum, has been known in U.S. Pat. No. 3,314,110. The shaping apparatus as taught in this patent is such that a heated sheet of a synthetic resin material is caused to contact on the surface of a cylindrical shaping drum, and then this synthetic resin sheet is drawn by suction onto the surface of this shaping drum by means of a plurality of tiny holes communicatively connected to a vacuum tank provided in the drum, thereby continuously shaping the synthetic resin sheet into a desired form. This shaping apparatus, however, possesses such defect that, although the shaping is primarily carried out by the suction drawing of the heated synthetic resin sheet around the shaping drum, if the surface temperature of the shaping drum is low, the synthetic resin sheet becomes immediately hardened upon its contact with the surface of the shaping drum with the consequence that no sufficient shaping operation can be accomplished. No sufficient shaping is possibly achieved by this apparatus unless approximately two hours is taken from commencement of the shaping operation. On the other hand, as the shaping operations are repeatedly performed with this apparatus, the temperature of the shaping surface of the drum rises due to heat of the heated synthetic resin sheet material accompanying sticking of the synthetic resin sheet, which has completed the shaping, onto the surface of the shaping drum with utter difficulty in peeling the sheet off the shaping surface of the drum. In order therefore to prevent the shaping drum of this apparatus from its undesirable rise in the surface temperature, an air blower is provided at one side portion of the shaping drum, through which the cooling air is blown onto the shaping surface of the drum to reduce the temperature, as has heretofore been practiced. However, in the case of cooling the shaping surface by the external air, not only adjustment of the shaping drum to an appropriate temperature in accordance with the material used is impossible, but also maintenance of the surface temperature of the shaping drum at a constant level against variations in the ambient temperature and increase in the production quantity cannot be performed properly.

Such shaping apparatus has been improved further by the present inventors as taught in the U.S. Pat. No. 3,837,973, although the problem of the temperature control in this apparatus still remains to be unsolved.

OBJECTS AND SUMMARY OF THE INVENTION

With the foregoing problem inherent in the known shaping apparatus for the thermoplastic resin sheet material in mind, it is a primary object of the present invention to provide an improved shaping apparatus for synthetic resin material free from the afore-mentioned various disadvantages present in the conventional shaping apparatus.

It is another object of the present invention to provide an improved shaping apparatus for the thermoplastic resin sheet material of a type, in which the shaping surface of the drum, which contacts a heated synthetic resin sheet is quickly heated to an appropriate temperature prior to commencement of operation of the shaping apparatus, and, after commencement of the operation, the drum surface is cooled to prevent itself from temperature rise due to its contact with the heated synthetic sheet so that the required appropriate temperature may constantly be maintained.

It is still another object of the present invention to provide an improved synthetic resin shaping apparatus which is capable of changing the surface temperature of the shaping drum in accordance with the kind of raw material used.

It is another object of the present invention to provide an improved synthetic resin shaping apparatus which is always capable of maintaining constant temperature on the shaping surface of the drum against any change in the ambient temperature, and increase in production quantity.

Briefly speaking, according to the present invention, there is provided an apparatus for shaping synthetic resin material which comprises in combination: a cylindrical outer shell with both ends being tightly closed, and having on the outer periphery thereof a shaping surface and a plurality of tiny holes for drawing by suction the synthetic resin sheet to be worked onto the shaping surface; an inner shell provided within the outer shell; a plurality of reduced pressure chambers defined in a space formed between the outer shell and the inner shell by means of a plurality of partition walls; a vacuum tank communicatively connected to said reduced pressure chambers through conduit pipes to reduce pressure in the reduced pressure chambers; a heat transfer medium accommodating chamber provided within the inner shell to maintain the shaping surface at a constant temperature by quickly heating the shaping surface to contact with the synthetic resin sheet to be worked prior to commencement of operation of the shaping apparatus, and by cooling the shaping surface to prevent the same from temperature rise due to its contact with the heated synthetic resin sheet after the shaping apparatus starts operation; and a heat transfer medium feeding means provided outside the shaping apparatus to automatically feed the heat transfer medium at a desired temperature into the heat transfer medium accommodating chamber.

The synthetic resin shaping apparatus of the present invention, similar to those conventional apparatus, is provided with a cylindrical outer shell having on its outer peripheral wall a shaping surface and a plurality of tiny holes to draw by suction the synthetic resin sheet to be treated onto the surface of the cylindrical shaping drum and with both ends thereof being tightly closed, a cylindrical inner shell provided within the outer shell, a plurality of reduced pressure chambers defined by splitting a space gap between the outer shell and the inner shell, and a vacuum tank which is communicatively connected to the reduced pressure chambers by way of conduit pipes to render them pressure-reduced. In addition to such conventional structure, the synthetic resin shaping apparatus according to the present invention is constructed in such a way that the above-mentioned vacuum tank is fitted on one of the end walls which tightly close the above-mentioned cylindrical outer shell at a position separate from the inner shell, thereby connecting the same to a vacuum pump outside the apparatus. Thus, the space created between the inner shell and the vacuum tank is made a chamber for accommodating heat transfer medium. It is preferable that a plurality of blades for agitating the heat transfer medium are provided in this heat transfer medium accommodating chamber to obtain a uniform temperature distribution in the medium.

Within the heat transfer medium accommodating chamber, there is provided a heat transfer medium feeding device to automatically supply the heat transfer medium at a desired temperature into the heat transfer medium accommodating chamber. This heat transfer medium feeding device is constructed with a head tank, a service tank, a heat transfer medium circulating pump, and a heat transfer medium temperature control device.

In this construction of the heat transfer medium feeding device connected with the heat transfer medium accommodating chamber, the heat transfer medium flows into the heat transfer medium accommodating chamber from the head tank through an inner barrel of a rotary joint provided on the opposite side of the vacuum tank, and the heat transfer medium thus flown thereinto, further enters into the service tank from the heat transfer medium accommodating chamber through an outer barrel of the rotary joint. From this service tank, the circulating heat transfer medium returns to the head tank, from which it originates, through a circulation flow passage by way of the heat transfer medium temperature control device and the circulating pump.

The heat transfer medium temperature control device, provided with a temperature sensing means and a heating means, heats the heat transfer medium to be circulated to a predetermined temperature prior to actuation of the heat transfer medium feeding device and lowers the temperature of the circulating heat transfer medium by supplying a separate heat transfer medium having a lower temperature than that of the circulating heat transfer medium into the service tank thereby maintaining the temperature of the above-mentioned heat transfer medium accommodating chamber at a constant level. By thus maintaining the heat transfer medium accommodating chamber at a constant temperature level, the temperature of the above-mentioned shaping surface can be kept at a desired temperature for shaping of the synthetic resin sheet.

For the heat transfer medium to be fed into the heat transfer medium accommodating chamber, it is preferable that the head tank is disposed at a position above the heat transfer medium accommodating chamber so that the heat transfer medium may be supplied into the heat transfer medium accommodating chamber under a certain definite static pressure created by the arrangement of the components of the apparatus. Accordingly, excess amount of the heat transfer medium flow into the head tank may be made returnable to the service tank as an overflow. On the other hand, the excess amount of the heat transfer medium from feeding of a low temperature heat transfer medium in the service tank may be discharged outside of the circulating system as an overflow.

It is also recommendable that a valve is provided at one place of the flow path for the heat transfer medium leading from the head tank to heat transfer medium accommodating chamber so as to enable the inflow quantity of the heat transfer medium into the heat transfer medium accommodating chamber to be adjustable. When the temperature in the heat transfer medium accommodating chamber needs be kept low, the valve is widely opened to cause a large amount of the heat transfer medium to circulate within the heat transfer medium accommodating chamber. In an opposite case to the above, the valve is opened slightly so as to cause only a small amount of the heat transfer medium to circulate.

Incidentally, the main body of the synthetic shaping apparatus may preferably be made of a heat conductive material such as aluminium.

The foregoing objects, other objects, and the detailed construction of the synthetic resin shaping apparatus of the present invention as well as the operations thereof will become more apparent from the following description thereof when read in conjunction with the accompanying drawings.

BRIEF DESCRIPTION OF THE DRAWINGS:

It should be noted that, in explaining the embodiment of the synthetic resin shaping apparatus according to the present invention, the same components and parts in each figure of the drawings are designated by the same reference numerals.

DETAILED DESCRIPTION OF THE INVENTION

Figure 1:
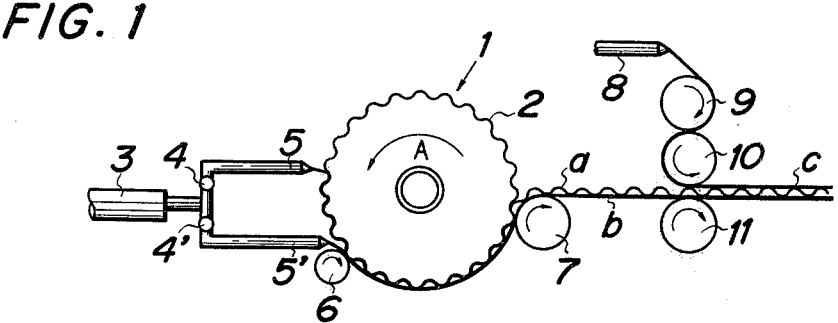
FIG. 1 is a schematic side elevational view showing one embodiment of the synthetic resin shaping apparatus for use in the present invention.

FIG. 1 indicates a process for manufacturing synthetic resin corrugated sheet by employing the synthetic resin shaping apparatus according to the present invention, in which a liner sheet is shown to be fusion-bonded on both surfaces of the center core sheet as shaped. The synthetic resin shaping apparatus shown in this figure principally consists of a cylindrical main body 1 having a shaping surface 2 on the outer periphery thereof. The cylindrical main body 1 rotates in the arrow direction A by a driving means (not shown) provided outside the main body. The apparatus further comprises a turn head 3 for an extruder, flow rate control means 4, 4' for thermoplastic synthetic resin in its molten state, a die 5 to form the center core sheet $a$, and another die 5' to form a liner sheet $b$.

The center core sheet $a$ is drawn to the shaping surface of the cylindrical main body 1 by suction force, and shaped into a desired form. After shaping of the center core sheet $a$, the liner sheet $b$ extruded from the die 5' is fusion-bonded to the center core sheet $a$ by means of a roller 6. The cylindrical main body 1 draw the center core sheet $a$ by suction until such time it reaches the point of the fusion-bonding roller 6. On one side of the center core sheet $a$ to which the liner sheet

*b* has been fusion-bonded, there is also fusion-bonded on the other side of the center core sheet another liner sheet *c* by means of a roller 9 and a pair of pressing rollers 10 and 11.

Figure 2:
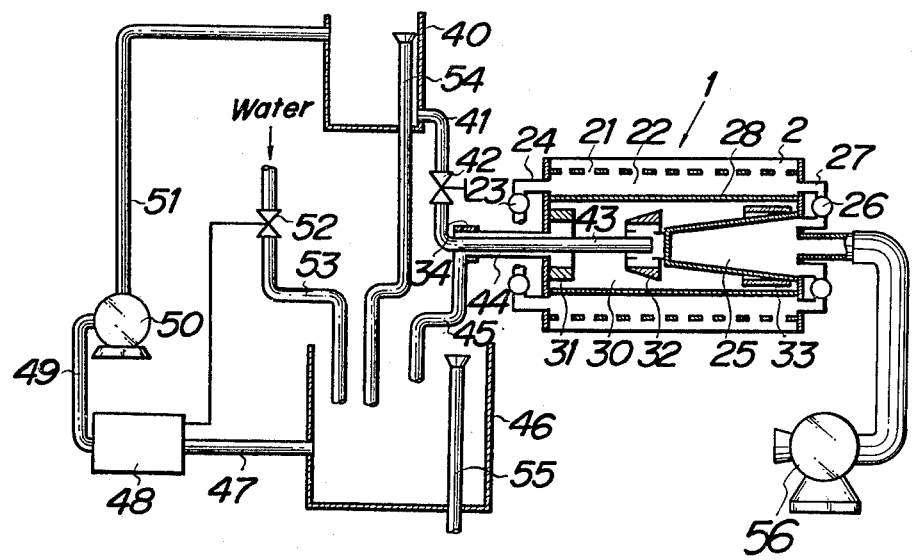
FIG. 2 is a schematic view in longitudinal cross-section of the synthetic resin shaping apparatus combined with the heat transfer medium feeding device according to the present invention.

Referring to FIG. 2 which indicates the synthetic resin shaping apparatus according to the present invention and a heat transfer medium feeding device as combined, the heat transfer medium used is water. In this system, the shaping surface 2 of the cylindrical main body 1 of the synthetic resin shaping apparatus is provided with a plurality of tiny holes 21 which communicate to a plurality of reduced pressure chambers 22. These tiny holes 21 act to draw the above-mentioned center core sheet *a* to the shaping surface 2 of the main body 1 by suction for the required shaping of the center core sheet thereon. Each of the above-mentioned reduced pressure chambers 22 is defined by an inner cylinder 28 and a plurality of partition wall 29 extending in the axial direction of the cylindrical main body 1 between the outer cylinder and the inner cylinder. Each of them is provided with a conduit pipe 24 communicated to the external atmosphere through a valve 23 and another conduit pipe 27 communicated to the vacuum tank 25 through a valve 26. The vacuum tank 25 is connected to a vacuum pump 56 provided outside the system. Inside the heat transfer medium accommodating chamber 30, there is provided a plurality of blades 31, 32 and 33 for agitating the heat transfer medium respectively secured at the inner surface of one of the end walls for the main body and at appropriate portions of the vacuum tank.

Figure 3:
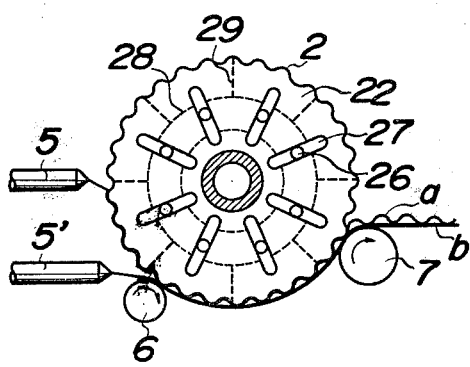
FIG. 3 is a fragmental side elevational view of the main part of the synthetic resin shaping apparatus.

The valves 23 and 26 act to draw the center core sheet *a* to the shaping surface of the main body 1 by suction force, the former being closed and the latter opened when the center core sheet *a* is extruded from the die 5, whereby the reduced pressure chambers 22 and the vacuum tank 25 become communicated each other to draw the center core sheet *a* by suction to the shaping surface of the main body. When the cylindrical main body 1 of the synthetic resin shaping apparatus rotates, and the center core sheet *a* comes to a position of the roller 6 (vide FIG. 1 or FIG. 3), the valve 23 is opened and the valve 26 is closed, whereby the reduced pressure chambers 22 become equilibrated with the atmospheric pressure and the synthetic resin sheet as shaped becomes peelable from the shaping surface 2.

Explaining further in detail, the valve 23 and 26 act to shape the center core sheet *a* by feeding the sheet *a* to the shaping surface 2 with suction force and to peel the center core sheet *a* off the shaping surface 2, respectively.

The valve 23 must be closed and the valve 26 must be opened at the position where the center core sheet *a* is extruded from the die 5 and is in contact with the shaping surface. That is to say, the reduced pressure chambers 22 are in reduced pressure condition by the vacuum pump 56 through valve 26, whereby the center core sheet *a* being in contact with the shaping surface 2 is shaped immediately. Since the shaping of the center core sheet is completed before the center core sheet *a* comes to a position near the roller 6, the valve 23 is opened and the valve 26 is closed at that position so that the reduced pressure chambers 22 are brought to atmospheric pressure. Thus, the center core sheet *a* and the liner sheet *b* fusion-bonded to the sheet *a* by the roller 6 can be peeled off the shaping surface via roller 7.

Generally, the condition under which the reduced pressure is maintained in the chambers 22 ranges between the position where the sheet *a* is contacted with the shaping surface 2 and the position near the roller 6, i.e., the vacuum condition occupies only a part of the whole shaping process. Therefore, the valves 23 and 26 are efficiently utilized to reduce the unnecessary operation of the pump 56.

The heat transfer medium (water in this case) from the head tank 40 passes through a conduit pipe 41, a flow rate control valve 42, and an inner barrel 43 of a rotary joint 34 to flow into the heat transfer medium accommodating chamber 30. After heat-exchange operation is conducted within this heat transfer medium accommodating chamber 30, the water as the heat transfer medium passes through the outer barrel 44 of the rotary joint 34 and reaches the service tank 46 by way of the conduit pipe 45. From this service tank 46, the water passes through the conduit pipe 47 to reach the heat transfer medium temperature control device 48, from which the medium flows into a conduit pipe 51 by way of a conduit 49 and a pump 50, and returns to the head tank 40.

The heat transfer medium temperature control device 48 which is provided therein with a temperature sensing means and a heating means (both being not shown) operates to quickly heat the water to a predetermined temperature level at the time of actuation of the synthetic resin shaping apparatus, and also to lower the temperature of the circulating heated water, when its temperature exceeds a predetermined level during the operation of the shaping apparatus, by feeding water at a low temperature to the service tank 46 through the conduit pipe 53 by actuating a valve 52, thereby maintaining the temperature in the heat transfer medium accommodating chamber 30 at a predetermined level.

Both the temperature sensing means and the heating means are conventional. For example, the temperature sensing means may be a thermometer having means to generate signals when the temperature is above or below the predetermined range. The heating means may be an electric or gas heater. Therefore, when the apparatus actuates wherein the heat transfer medium is lower than a predetermined level, the thermometer generates a signal to actuate the heater, whereby the heat transfer medium is heated to a predetermined level. When the temperature of the heat transfer medium rises to a predetermined level, the signal from the temperature sensing means stops thereby cutting the operation of the heater. On the other hand, in case the temperature of the heat transfer medium exceeds the predetermined level, said thermometer generates a signal to open valve 52, whereby the water at a low temperature is introduced into the service tank 46 to lower the temperature of the heat transfer medium. When the temperature of the heat transfer medium lowers to a predetermined level, the signal stops thereby closing the valve 52. Since the heat transfer medium within the service tank 46 is maintained at a constant temperature, and the medium having the constant temperature is fed to the chamber 30 through the head tank 40 and so on, the chamber 30 is maintained at a constant temperature.

The head tank 40 is constantly fed with heated water by the pump 50, and the excess amount of heated water is returned to the service tank 46 through the conduit pipe 54. A conduit pipe 55 is also provided within the service tank 46, and the excess amount of water is discharged therethrough to a drain (not shown).

Although not shown, there are provided an air vent and a drain vent in this heat transfer medium accommodating chamber 30. The service tank 46 and the head tank 40 are also provided with such drain vent in each of them. Also, in the service tank 46, there is provided an agitator to maintain the temperature in the tank at a constant level.

In the embodiment according to the present invention, the circulating system for the heat transfer medium is so designed that the temperature in the conduit pipe 47 is sensed, and, if the temperature exceeds the predetermined level, cold water is fed to the service tank 46, although it may be feasible to supply the cold water either to the service tank 46, or to the head tank 40.

EXAMPLE

Figure 4:
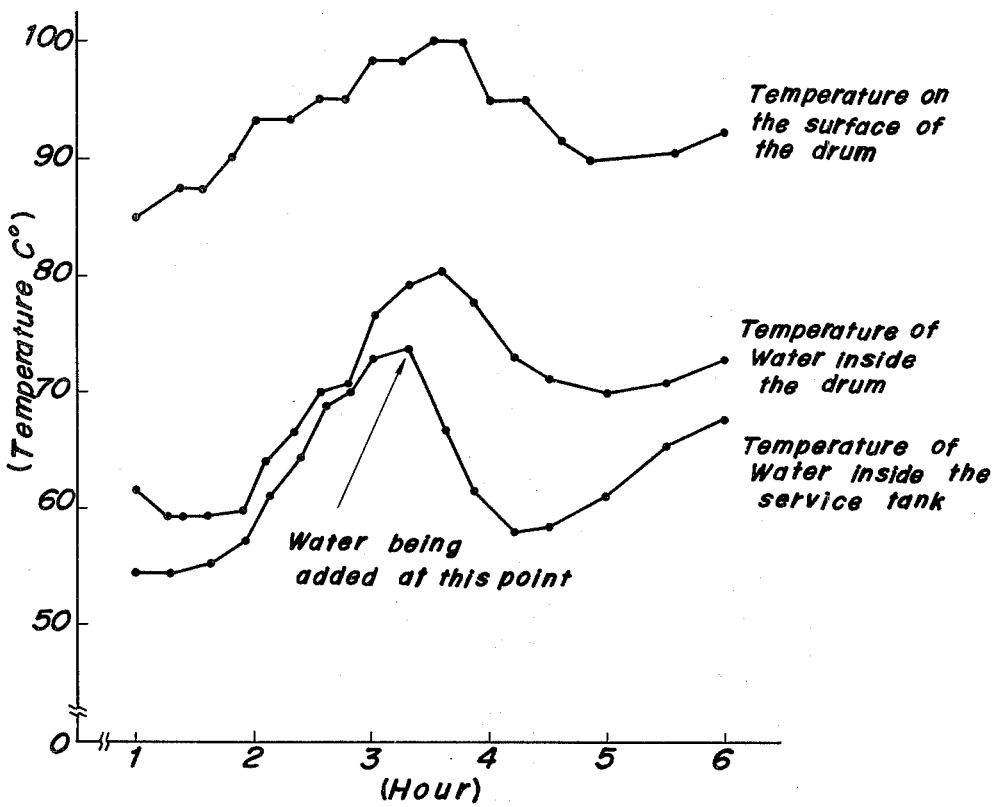
FIGS. 4 and 5 are respectively graphical representations showing the relationship among the surface temperature of the shaping drum, the water temperature in the heat transfer medium accommodating chamber and the water temperature in the service tank.
Figure 5:
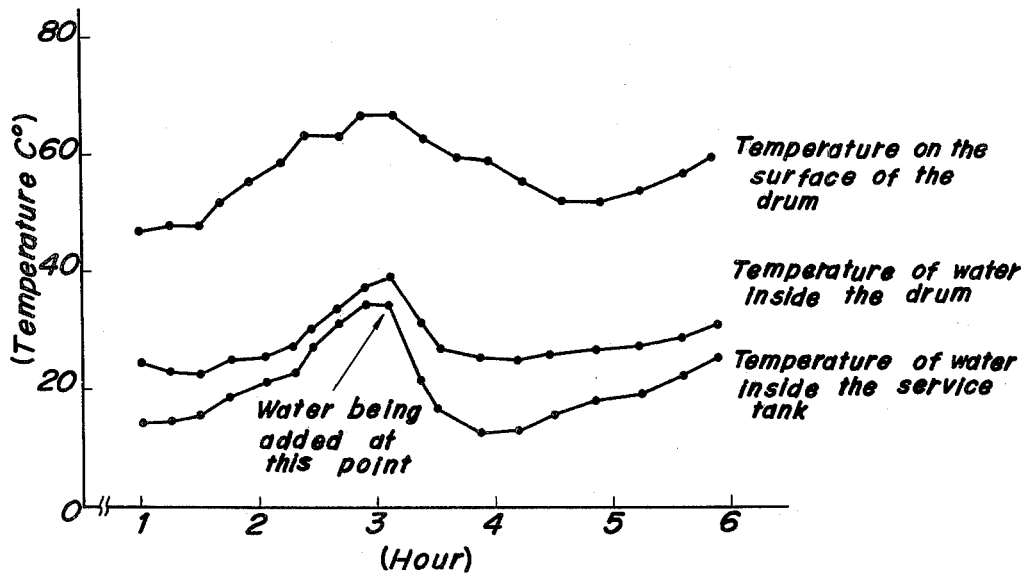

In the afore-described apparatus, relationship among the surface temperature of the shaping drum, the water temperature in the heat transfer medium accommodating chamber, and the water temperature of the service tank were examined in the case of shaping the synthetic resin sheet extruded from the die at a temperature of 190° C to 200° C. This is to determine the appropriate temperature of water which flows into the heat transfer medium accommodating chamber to maintain the surface temperature of the shaping drum at a constant level. The volume of the heat transfer medium accommodating chamber is 350 liters, while the water accommodated therein is only 175 liters which is half the volume of the chamber. The volumes of the service tank and the head tank are respectively 170 and 100 liters. As the consequence, approximately 470 liters of water in total is circulated. Incidentally, the cylindrical main body of the synthetic resin shaping apparatus is rotated at a rate of 80 rpm. The flow rate of water into the heat transfer medium accommodating chamber is 9 liter/min. When the surface temperature of the shaping drum is maintained at 85° – 95° C, while the flow rate is set at 20 liters/min. when the surface temperature is maintained at 55° to 65° C. The relationship is shown in the graphical representations in FIGS. 4 and 5.

As it will be apparent from these graphs, the difference between the surface temperature of the shaping drum and the temperature in the heat transfer medium accommodating chamber is from 20° to 25° C, and the water temperature in the service tank may be 5° to 10° C lower than the water temperature in the heat transfer medium accommodating chamber. In other words, in order for the surface temperature of the shaping drum to be kept at 85° to 95° C, the water temperature of the service tank is kept at approximately 60° C, while the water temperature may be maintained at about 20° C for the surface temperature of the shaping drum at 55° to 65° C.

In addition, when polyethylene is to be shaped, the surface temperature of the shaping drum should preferably be kept at 75° to 100° C, while, in the case of polypropylene, the surface temperature should preferably be maintained 40° to 85° C.

While the present invention has been described with particular reference to the preferred embodiment, it should be understood that the invention is not restricted to such embodiment, but any change and modification may be made within the spirit and scope of the present invention as recited in the appended claims.

What is claimed is:

1. In an apparatus for shaping synthetic resin material comprising:
    a. a synthetic resin shaping apparatus comprising a cylindrical outer shell having on the outer periphery thereof a shaping surface and a plurality of tiny holes for drawing by suction a synthetic resin sheet, an inner shell provided within said outer shell, a plurality of reduced pressure chambers formed in a space between said outer shell and said inner shell, a vacuum tank communicatively connected to said each reduced pressure chamber and a heat transfer medium accommodating chamber; and
    b. a heat transfer medium feeding means provided outside said shaping apparatus for automatically feeding the heat transfer medium at a predetermined temperature into said heat transfer medium accommodating chamber,
    said apparatus being characterized in that said heat transfer medium accommodating chamber is provided within said inner shell and has a plurality of blades for agitating the heat transfer medium therein, and that said heat transfer medium feeding means comprises a head tank, a service tank, a pump for circulating the heat transfer medium and a heat transfer medium temperature control means, the heat transfer medium flowing into said heat transfer medium accommodating chamber from said head tank, then said medium flowing out from said heat transfer medium accommodating chamber and entering into said service tank, and finally returning to said head tank from said service tank through said heat transfer medium temperature control means and said pump, thereby forming a circulating path among said components.

2. In the apparatus for shaping synthetic resin material as claimed in claim 1, said heat transfer medium temperature control means comprising a temperature sensing means and a heating means, said temperature control means quickly heating said heat transfer medium to be circulated at the start of said shaping apparatus to a predetermined temperature, and lowering the temperature of said circulating heat transfer medium by supplying into said service tank separate heat transfer medium having lower temperature than said circulating heat transfer medium, whenever the temperature of said circulating heat transfer medium exceeds the predetermined temperature by the operation of said shaping apparatus.

3. In the apparatus for shaping synthetic resin material as claimed in claim 2, said head tank being positioned above said heat transfer medium accommodating chamber to feed said heat transfer medium into said heat transfer medium accommodating chamber under a constant static pressure created by said positioning of said head tank.

* * * * *